United States Patent [19]

Fitzner

[11] 4,190,798
[45] Feb. 26, 1980

[54] TACHOMETER DRIVEN FROM A CAPACITOR DISCHARGE IGNITION SYSTEM AND INCLUDING A TRANSISTORIZED SHUNT VOLTAGE REGULATOR

[75] Inventor: Arthur O. Fitzner, Fond du Lac, Wis.

[73] Assignee: Brunswick Corporation, Skokie, Ill.

[21] Appl. No.: 785,015

[22] Filed: Apr. 6, 1977

[51] Int. Cl.$^2$ .............................................. G01P 7/00
[52] U.S. Cl. .............................. 324/169; 323/22 Z; 361/239
[58] Field of Search ............. 324/163, 168, 169, 78 J, 324/78 E; 361/239; 340/263; 328/140; 307/233 R, 233 A; 323/22 Z

[56] References Cited

U.S. PATENT DOCUMENTS

| | | | |
|---|---|---|---|
| 3,202,910 | 8/1965 | Fathauer | 324/169 |
| 3,473,048 | 10/1969 | Winn | 307/233 |
| 3,523,198 | 8/1970 | Keller | 323/22 Z |
| 3,588,698 | 6/1971 | Ashcraft | 324/169 |

OTHER PUBLICATIONS

Small et al.; A Transistorized Tachometer; Radio & TV News; Jan. 1959; pp. 42–43.

Parron, N.; Tach-Dwell Meter; Wireless World; vol. 81, No. 1477; p. 413; Sep. 1975.

Primary Examiner—Robert J. Corcoran
Attorney, Agent, or Firm—Andrus, Sceales, Starke & Sawall

[57] ABSTRACT

A tachometer circuit for an engine having an alternator driven capacitive discharge ignition system functions as a frequency-to-current converter converting each ignition capacitor discharge into a precisely controlled amount of electric charge, which is then passed thru an indicating microammeter movement graduated in RPM. The precisely controlled electric charge is developed in a charge transfer capacitor, with the peak voltage appearing across the capacitor being regulated by a programmable transistorized voltage regulator. The temperature coefficient of the charge transfer capacitance is neutralized by the temperature coefficient of the voltage regulator, such that the product of capacitance multiplied by voltage—which is equivalent to charge—remains constant. The precisely controlled charge is initially established by machine trimming of a voltage—determining resistor in the voltage regulator, thereby allowing practical large volume manufacture of the circuit from unmatched components.

11 Claims, 5 Drawing Figures

TACHOMETER DRIVEN FROM A CAPACITOR DISCHARGE IGNITION SYSTEM AND INCLUDING A TRANSISTORIZED SHUNT VOLTAGE REGULATOR

BACKGROUND OF THE INVENTION

The present invention relates to a pulse driven tachometer apparatus particularly applicable to internal combustion engines employing capacitive discharge ignition systems.

Capacitive discharge ignition systems have been successfully employed for firing the spark plugs of internal combustion engines, particularly two-cycle engines. Generally, in capacitive discharge ignition systems, a single firing or ignition capacitor, or a group of alternately operable capacitors, is charged to a selected voltage level. The charging source may be a battery-converter unit or an engine-driven alternator unit. The ignition capacitor is connected in a discharge circuit in series with a pulse transformer and an electronic switch such as a silicon controlled rectifier. When the switch is turned on, the fully charged ignition capacitor rapidly discharges through the pulse transformer for firing the associated spark plug of the engine. Although various systems have been developed, they all generally have a capacitor voltage wave which exhibits a very steep wave front as the capacitor is discharged and the number of capacitor discharges per minute exactly equals the engine revolutions per minute (RPM) multiplied by the number of times the capacitor discharges in one engine revolution. The frequency of the capacitor's discharges is therefor a true and accurate indication of the speed of the engine and can be employed to drive a suitable tachometer circuit for providing an engine speed or RPM indication.

Prior art tachometer circuits which have been satisfactorily employed on engines having capacitive discharge ignition systems generally include a charge transfer or measuring or "bucket" capacitor in series with a direct current meter and a rectifying means. The measuring capacitor is filled or charged with a selected electical charge value in response to each discharge of the ignition capacitor and is then fully discharged or emptied. The value of charge to which the measuring capacitor is filled multiplied by the frequency of such charging constitutes a precisely calibrated average current flow which is directly proportional to the speed of the engine. If such a capacitor is connected in series with a suitable microammeter, the output reading mechanism of the meter can be graduated in revolutions per minute to provide a direct reading thereof. In a typical prior art circuit, the measuring capacitor is connected in series with a diode and a microammeter to the ignition capacitor circuit by a resistor-capacitor coupling network. The opposite sides of the measuring capacitor are connected to ground or to reference potential by suitable diodes, with the diode on the input side of the measuring capacitor being a Zener diode. During the charging of the ignition capacitor, current also flows from the charging source through the coupling network into the measuring capacitor-diode network. The forward drop of the diodes are essentially constant and equal and, consequently, the voltage across the measuring capacitor is essentially zero. During charging of the ignition capacitor, no current passes through the meter as a result of the blocking diode in the meter circuit.

At the instant the ignition capacitor discharges, the voltage changes abruptly and the measuring capacitor is coupled through the resistor-capacitor network to a relatively high transient voltage of an opposite polarity. The diode in the meter circuit is now forward biased and initiates current flow through the measuring capacitor and the meter. The level of this transient voltage is controlled by the Zener diode on the input side of the capacitor. The Zener-limited transient voltage causes the measuring capacitor to be rapidly charged to the regulated voltage, with the charging current flowing through the series circuit with the meter. When the ignition capacitor again recharges, the measuring capacitor empties or discharges to a zero charge level as a result of the similar grounded or reference diodes to the opposite side thereof. Thus, each discharging of the ignition capacitor results in a precise filling of the measuring or "bucket" capacitor with a given electrical charge. As a result, a corresponding current flow occurs in the meter which functions to indicate the average current flow which is proportional to the speed of the engine.

Various available capacitor discharge ignition systems employ a single capacitor which is charged to a voltage level of the appropriate polarity while others employ a pair of capacitors which are alternately charged and discharged. Further, depending upon the particular circuit design, the operating voltage levels may be different. For example, in one circuit design a single capacitor is sequentially charged to a level of 100 to 150 volts and then discharged; the capacitor may be charged two or three or four times per revolution depending on whether connected to a two or three or four-cylinder engine. In more recent versions, a single capacitor is charged to a level of 200 to 300 volts and discharged an appropriate number of times per crankshaft revolution. In one multiple capacitor design, particularly applied to a two cylinder, two cycle engine, one capacitor is charged to a positive voltage level of from 200 to 300 volts and the second capacitor is charged to a corresponding negative voltage. The capacitors are alternately charged and discharged, each being discharged once per revolution.

A suitably-calibrated tachometer circuit may be employed with any of the aforementioned capacitive discharge ignition systems as each exhibits the desired steep wave front when the capacitor discharges and a capacitor is discharged at least once per revolution.

Generally, the ignition circuits are potted in a suitable protective resin with appropriate external terminals or connections for connecting to an alternator power source, trigger pulse generator, output pulse transformers, and an ignition shut-off switch. In certain systems an external connection to the ignition capacitor means is not available. In such a system, a special adaptor must be interconnected to some other portion of the ignition circuit to duplicate externally of the ignition box the voltage wave shape of the capacitor means.

The prior art tachometer circuits incorporating a measuring capacitor are used commercially, but although appearing quite simple are relatively expensive and difficult to produce to a high degree of accuracy and stability. Generally, the prior art tachometer circuits are temperature sensitive and the degree of sensitivity of different circuits of the same design may vary. For example, the effective size of the measuring capacitor and the level of filling of the capacitor varies from circuit to circuit with temperature as hereinafter discussed. Ignition capacitor voltage level variations may occur over the speed range for any given ignition system. The ignition capacitor voltage levels may vary from engine to engine even on supposedly identical engines. These variations, in turn, will result in small errors in the readings of the tachometers. Although the accuracy variation is not such as to create a hazardous condition, such tachometers do not provide a highly accurate indication which may be significant in obtaining optimum engine performance particularly in the operation of highly tuned engines and the like.

In addition, a very significant cost factor in the commercial production of tachometers arises from the relatively high inventory costs and relatively expensive calibration procedures required to produce a consistently accurate tachometer.

For example, circuit designers recognize that the measuring capacitor, selected because of practical considerations, has a positive temperature coefficient such that the electrical capacitance of the capacitor increases somewhat with increasing temperature. Compensation is conventionally provided by connecting a relatively small compensating capacitor, having a large negative temperature coefficient, in parallel with the measuring capacitor. The compensating capacitance desirably is small for reasons of economy and overall temperature stability, inasmuch as the temperature characteristic of the compensating capacitor is difficult to control precisely. This, however, requires the charging of the compensating and measuring capacities to a relatively high voltage and, consequently, requires the use of a high voltage Zener diode for limiting of the charge level to a selected value during each cycle. High voltage Zener diodes, however, generally have a significant positive temperature coefficient and this requires further temperature compensation. Although temperature stable diodes are available, the cost is prohibitive. As a practical matter, commercial design is therefore a compromise employing a relatively smaller measuring capacitor and a plurality of relatively small, but somewhat less than optimum sized, compensation capacitors connected in parallel. The combination overcorrects for the temperature coefficient of the measuring capacitor in an attempt to at least partially compensate or cancel the effects of the positive temperature coefficient of the high voltage Zener diode.

Such design has provided at best, a partial alleviation of the circuit's temperature compensation. This is particularly true where the small compensating capacitors are also, and primarily, employed as the calibration elements. Thus, the circuit components employed must include manufacturing tolerances and each tachometer circuit must, therefore, include some individually selected component to achieve the required adjustment for the tachometer calibration in combination with the actual values of other components. In practice, the compensation capacitors which have to be wired into the circuit have provided a convenient component and, therefore, the designers have accepted a semi-optimum temperature compensation in favor of this method of calibration.

Generally, the tachometer unit is assembled to the point of connecting a pair of calibrating semi-compensating capacitors in the circuit. A selector switch unit is first connected to the partly assembled module and connects various selectable values of available calibrating capacitors into the tachometer circuit. The individual performing the calibration reads the position of the selector switch unit when a proper output reading is obtained and is thereby informed of the proper selection from the set of available capacitors. The measured sizes of calibration capacitors are taken out of stock and then soldered into the module, normally by hand. The calibrating capacitors are now normally individually checked.

The use of a pair of calibrating capacitors requires a very significant inventory of capacitors because a plurality of relatively small capacitance values is required in order to properly provide calibration plus partial temperature compensation for the normal manufacturing tolerances encountered in commercially available Zener diodes and the relatively large measuring capacitors. Further, unless large quantities are purchased with each order, the individual cost of the calibrating capacitors is prohibitively high.

Further, in general production practice, a linear precision resistor is used as the load element during the calibration procedure. The average current is measured as a DC voltage appearing across this precision resistor. Although this theoretically is satisfactory, the measurement in fact ignores the effects of the inductance in the standard microammeter.

In practice, the microammeter generally includes a coil positioning a readout pointer, and the coil introduces inductance in the charging circuit of the measuring capacitor. Such inductance tends to establish a freewheeling current effect and maintains current flow through the meter in excess of the charge flow into the measuring capacitor. This, of course, further contributes to slight inaccuracy in the RPM reading of the tachometer.

The magnitude of the free-wheeling phenomena also changes with the operating voltage level of the ignition capacitor and introduces a variable source of error in the tachometer circuit.

Further, with the various systems employing different discharges per revolution of the ignition capacitors, the size of the measuring capacitor must be adjusted accordingly to produce the same meter deflection with the measuring capacitor charged to a common level. This, of course, is desirable since it allows standardization upon a single basic RPM calibrated DC meter. The average current flow varies with the number of charges per revolution which may be two charges per revolution for one system and four charges per revolution for a second system. The size of the measuring capacitor for the first system must be twice that of the second system, if the same meter deflection is to be developed at the same speed. Two different circuit modules are designed for use with the single standardized meter. This further contributes to the total cost of inventory and increases the need for tachometer apparatus which can be constructed with reduced costs.

SUMMARY OF THE PRESENT INVENTION

The present invention is particularly directed to an improved measuring capacitor tachometer circuit in which a measuring capacitor is combined with a transistorized programmable voltage limiting circuit means functioning as the voltage level regulating device and the calibration and temperature compensation means to provide calibration for circuit components and directly compensate for the temperature coefficient of the measuring capacitor and other circuit components. The voltage limiting circuit includes a sensing branch in combination with a transistorized amplifier means including a voltage sensitive means which responds to signals above a threshold voltage to actuate the circuit. The transistorized programmable voltage limiting circuit also has a current versus voltage characteristic which is slightly different from that of a conventional Zener diode such as generally employed in prior art tachometer circuits and in particular has an extremely low dynamic impedance. The measuring capacitor is, therefore, accurately charged to the proper voltage and produces a corresponding accurate drive of the meter. The transistorized, programmable voltage limiting input circuit can be designed to provide essentially perfect cancellation of the positive and negative temperature coefficient characteristics of the tachometer module. The programmable threshold input circuit includes a trimmable resistor which is adapted to be machined to vary its resistance for purposes of circuit calibration with any given measuring capacitor. The machine trimmable resistance element permits accurate calibration of the module in a simple and rapid procedure, and particularly adapts the module to mechanized production procedures. For example, the individual tachometer circuit modules may be completely assembled in the form of a plurality of identical circuit modules on a large printed circuit board. The resistance elements are exposed for suitable automatic machining, after which the modules are separated, placed in their individual housings, and potted. The total assembly and calibration cost can thereby be minimized. As a benefit of the machine-adjustable characteristics of the transistorized, programmable voltage limiting circuit, a single basic inventory of circuit components which fall within a specified tolerance is all that is required. The use of a single standardized measuring capacitor having a known positive temperature coefficient can be readily compensated and calibrated for, even though the components within the programmable Zener circuit likewise have standardized values.

In accordance with still a further aspect of the present invention, the free-wheeling effect encountered with the conventional tachometer unit is essentially eliminated by adding an appropriate snubbing resistance in series with the meter.

More particularly, in accordance with a preferred and particularly unique embodiment of the present invention, the tachometer circuit includes a single measuring capacitor having a pair of near identical diodes on the opposite sides thereof and connected to ground or reference potential. A meter in series with a rectifying diode and a resistor are connected to the one side of the capacitor. The opposite side of the capacitor is connected by a series connected coupling capacitor and coupling resistor to the ignition capacitor circuit, with the ignition capacitor waveform or a duplication thereof applied via the coupling capacitor and coupling resistor to the measuring capacitor. The programmable, transistorized voltage limiting input circuit is connected in parallel with the diode on the input side of the measuring capacitor. The voltage limiting input circuit includes a two-resistor voltage dividing network, one of which being a machine-trimmable sensing resistor.

A sensing transistor has its input circuit connected in series with the reverse-biased emitter-to-base junction of a control transistor and the forward-biased base-to-emitter junction of an output transistor, and the combination is connected across the trimmable sensing resistor of the voltage dividing network. A leakage diverting resistor is connected across the base-to-emitter junction of the output transistor. Although there is some small conduction at lower voltages, the combination of the three transistors conducts essentially and importantly at a voltage across the trimmable sensing resistor equal to the diode-like base-to-emitter threshold voltage of the sensing transistor plus the Zener-like emitter-to-base breakdown voltage of the control transistor plus the diode-like base-to-emitter threshold voltage of the output transistor.

The output transistor in turn is connected directly across the diode on the input side of the capacitor.

The circuit is designed and constructed such that the trimmable sensing resistor has an initial excessively low resistance. This result in a greater-than-normal voltage dividing action, and the programmable voltage limiting circuit initially reacts by allowing a greater-than-normal voltage to appear across the measuring capacitor, resulting in the excessive charging of the measuring capacitor. The "Zener" or limiting voltage of the programmable transistorized input circuit is reduced by machining of the trimmable resistor to increase its resistance until the desired precise calibrated charging of the measuring capacitor is obtained. The trimmable resistor is uniquely a thick film resistor which may be trimmed by a suitable jet of abrasive particles, by a laser beam, or the like. Such methods are particularly adapted to automated calibration of tachometer circuit modules.

In capacitive discharge ignition systems which do not have an external tap or connection to the ignition capacitor voltage, a coupling diode network can be interposed between the charging source and the ignition capacitor to generate an appropriate voltage signal for proper operation of the tachometer circuit.

The present invention thus provides a relatively low cost tachometer apparatus for capacitor discharge ignition systems which produces accurate indication of the engine speed and which may be constructed with a minimum practicable number of components and by commercially economical production methods.

BRIEF DESCRIPTION OF THE DRAWING

The drawings furnished herewith illustrates the best mode presently contemplated by the inventor for carrying out the subject invention, and clearly discloses the above advantages and features as well as others which will be readily understood from the subsequent description of the illustrated embodiments.

In the drawings.

DESCRIPTION OF ILLUSTRATED EMBODIMENT

Figure 1:
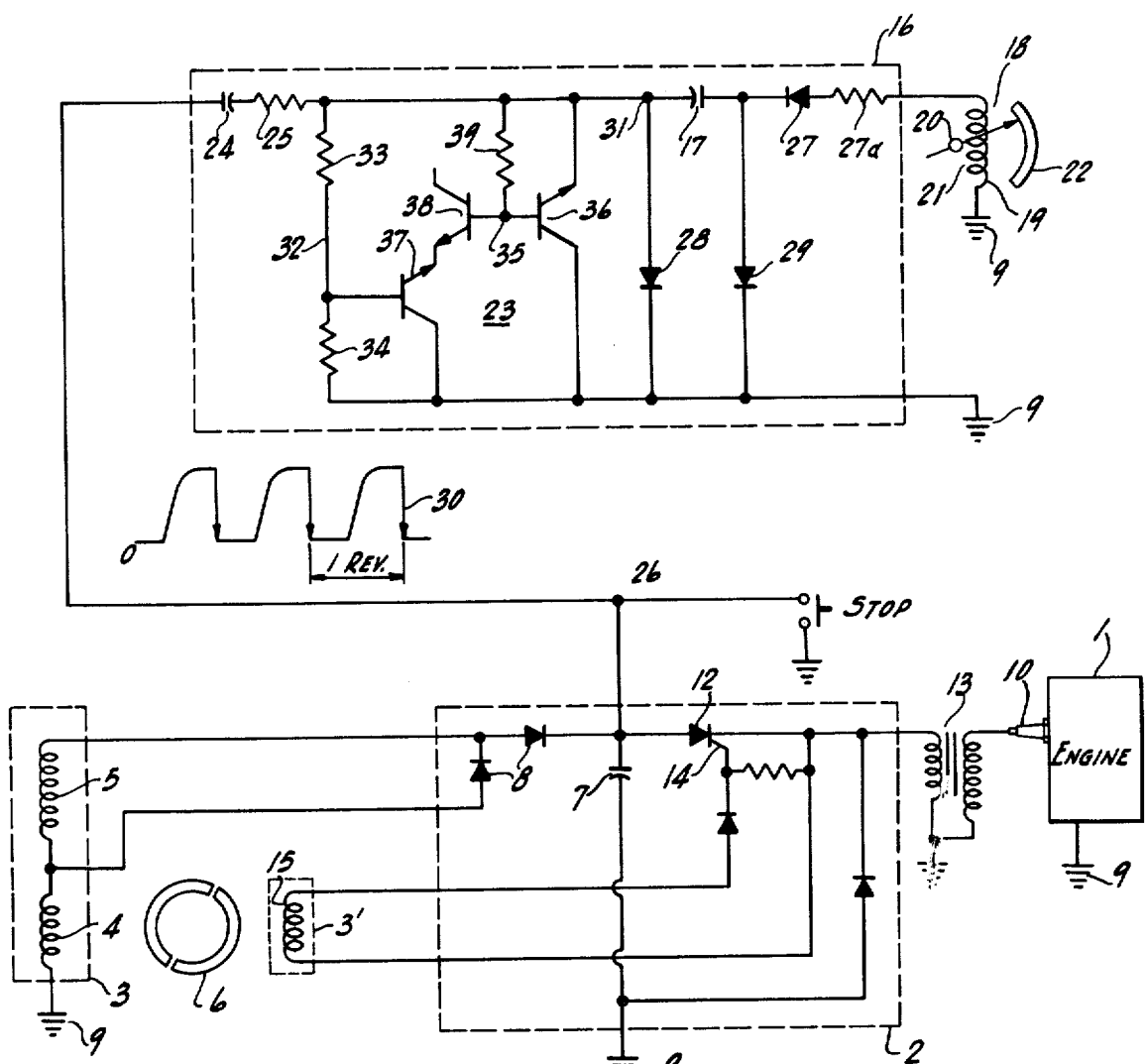
FIG. 1 is a schematic view of an engine with a capacitor discharge ignition system having a positive voltage waveform on the ignition capacitor driving a tachometer circuit constructed in accordance with the teaching of the present invention.

Referring to the drawings and particularly to FIG. 1, the present invention is illustrated applied to an internal combustion engine 1 having a capacitor discharge ignition unit 2. The ignition unit 2 may be driven from a battery-converter unit or directly from an engine driven alternator. The unit 2 is shown driven from an alternator 3 for purposes of description and connected to a one-cylinder engine 1. The alternator 3 is schematically shown including a high speed winding 4 and low-speed winding 5 interconnected to input terminals of the ignition unit 2. A rotor 6 is coupled to the engine 1 and generates in alternator windings 4 and 5 an alternating voltage supply for charging of an ignition capacitor 7 through a pair of rectifying diodes 8. The return charging path is through a common ground connection 9 of the alternator and the ignition unit. The ignition unit 2 includes the ignition capacitor 7 which is connected in a charging circuit to the alternator 3 and in a firing circuit to the spark plug 10 of engine 1 through switch means shown as silicon controlled rectifier means 12 and suitable pulse transformer 13. The gate 14 of the controlled rectifier 12 is connected to a suitable trigger source 15 such as trigger unit 3'. The capacitor 7 is charged from the output of the alternator 3 and then discharged through the pulse transformer 13 once every engine revolution.

The ignition system 2 is advantageously used in connection with a marine propulsion drive and particularly a two cycle engine 1 for an outboard motor, not shown.

The operating efficiency of an internal combustion may vary with the operating speed of the engine and a tachometer unit is advantageously employed to provide the user with a visual reading of the engine speed. The tachometer unit 16 is generally of the type which includes a measuring capacitor 17 connected to ignition unit 2 and a microammeter 18. The measuring capacitor 17 is charged at each discharge of the ignition capacitor 7 by a current which also flows through microammeter 18. The microammeter 18 is any suitable DC meter and is diagrammatically shown as an electromagnetic microammeter movement having a coil 19 mounted to a springloaded rotor 20 which rotates through a partial revolution in accordance with the average current flow through the meter coil 19. An indicating pointer 21 is coupled to the rotor and swings over a face plate having a scale 22 graduated to read in RPM. As more fully described hereinafter, the amount of electric charge that flows per engine ignition discharge is precisely regulated such that the microammeter 18 reading is a true reading of the engine speed.

The present invention is particularly directed to the construction of a tachometer unit 16 employing a transistorized programmable threshold regulator 23 to establish a precise charging of measuring capacitor 17 and further to compensate for the temperature characteristic of the measuring capacitor 17 and other circuit components. The illustrated embodiments of the invention are further readily constructed with a minimum of inventoried components and at a relatively low assembly cost to permit practical implementation of the invention.

The alternator and the ignition unit 2 may therefore be of any suitable construction producing a repeating waveform having a steep wavefront on discharge of the ignition capacitor during each revolution and are only diagrammatically and partially shown as necessary therein for clearly describing a preferred embodiment of a tachometer apparatus 16 in accordance with the present invention.

In the illustrated embodiment of the invention, the tachometer circuit 16 includes a coupling capacitor 24 connected in series with a resistor 25 to the one side of the measuring capacitor 17. The coupling capacitor 24 is connected to the one side of the ignition capacitor as at the terminal 26. The opposite side of the measuring capacitor 17 is connected in series with a diode 27 and a damping resistor 27a to the meter coil 19, the opposite side of which is connected to ground 9. A pair of identical reference diodes 28 and 29 are connected between the opposite sides of the measuring capacitor 17 and ground 9.

When the ignition capacitor 7 is being charged with a relatively positive voltage waveform 30 with regard to ground, a portion of the output of the alternator 3 also flows through the coupling capacitor 24 and the series resistor 25 to the common node 31 of the measuring capacitor 17, the regulator 23 and the diode 28. The current divides through the diode 28 connected to the note 31 and the capacitor 17 in series with the second diode 29. The voltage regulator does not conduct when node 31 is positive relative to ground by the small forward drop of diode 28. The diode 27 in the meter coil circuit is back-biased and also does not conduct. The voltage drops across the reference diodes 28 and 29 are essentially identical. The voltage appearing across the measuring capacitor 17 is therefore essentially zero and the measuring capacitor 17 can be considered completely discharged. When the ignition capacitor 7 is discharged through the low impedance circuit of rectifier 12 and pulse transformer 13, the voltage wave 30 drops almost instantaneously to zero.

The voltage at the junction or node 31 of the measuring capacitor 17, the regulator 23 and input diode 28 abruptly starts to rise toward a relatively high negative voltage, significantly in excess of the threshold of regulator 23. Regulator 23 limits the negative voltage at the node 31 to the voltage at which regulator 23 has been set to regulate. The regulated negative voltage at node 31 generates a charging current for the capacitor 17 and the meter network; as a result of forward conduction in diode 27 the measuring capacitor 17 is rapidly filled with a charge. The corresponding current flows through the microammeter coil 19 in series with the rectifying diode 27 and the damping resistor 27a. With the capacitor 17 charged to the level determined by the regulated voltage of regulator 23, the current through the coil 19 terminates. Shortly thereafter the ignition capacitor 7 is again charged from the alternator 3. During this latter period of time, the capacitor 17 again discharges to zero through the diode network 28-29 as previously discussed. The rectifying diode 27 in the meter circuit again prevents current flow through the meter coil 19, until the next firing of the engine and the discharge of the ignition capacitor 7, at which time the cycle of the charging and discharging of measuring capacitor 17 is again repeated.

As previously described, the present invention is particularly directed to the unique use of threshold regulator 23 to provide a method of reliable and accurate calibration and temperature compensation. In particular, in the illustrated embodiment of the invention, the transistorized threshold regulator 23 includes a voltage sensing branch 32 having a thick film resistor 33 connected to the common signal node 31 and a series connected fixed divider resistor 34 connected to reference or common ground 9. The voltage dividing sensing branch 32 senses the voltage input to the capacitor 17 and is connected to actuate a transistorized threshold branch 35 the output of which is connected to control the conduction in a voltage limiting shunting transistor 36 which is connected in parallel with the diode 28. The circuit functions to turn on the shunting transistor 36 when the negative voltage on node 31 reaches a selected level as determined by the voltage dividing network 32 to thereby limit the voltage level to which the measuring capacitor 17 is charged.

More particularly the voltage regulator 23 includes a sensing transistor 37, shown as an NPN transistor, the base of which is connected to the common node of the voltage dividing branch 32. The collector is grounded and the emitter is connected to the common node 31 in series with the emitter-to-base portion of an NPN control transistor 38 and a resistor 39. The emitter of transistor 38 is connected to the emitter of transistor 37 and the base is connected in series with resistor 39 to the common node 31. The transistor 38 is therefore back biased by the negative transient voltage pulse which charges the measuring capacitor 17. The control transistor 38 functions as a voltage threshold device similar to a very low current Zener diode by using the emitter-base breakdown characteristic of transistor 38 to establish a "Zener" reference voltage. The sensing transistor 37 is forward biased by the negative voltage on node 31 with a turn-on voltage being applied across the base-to-emitter junction of transistor 37 in series with the Zener-like reverse-biased base-to-emitter junction of transistor 38 plus the base-to-emitter junction of transistor 36. The voltage drop across the sensing resistor 33 must reach the summation of the voltage drops across the reverse-biased junction and the two forward-biased junctions. The precise voltage level at node 31 required to reach this threshold voltage is, of course, controlled by the relative resistance of the resistors 33 and 34 of the voltage dividing branch 32.

As a practical matter, the unit is constructed with a trimmable resistor 33 of a relatively low value such that the measuring capacitor 17 is overcharged for the selected meter 18. The trimmable resistor 33 is then trimmed to increase its resistance and thereby reduce the negative voltage required on node 31 to turn on the voltage regulator 23. The resistance is increased until the measuring capacitor 17 receives the precise amount of charge to provide proper readout and calibration of the RPM meter 18.

Figure 2:
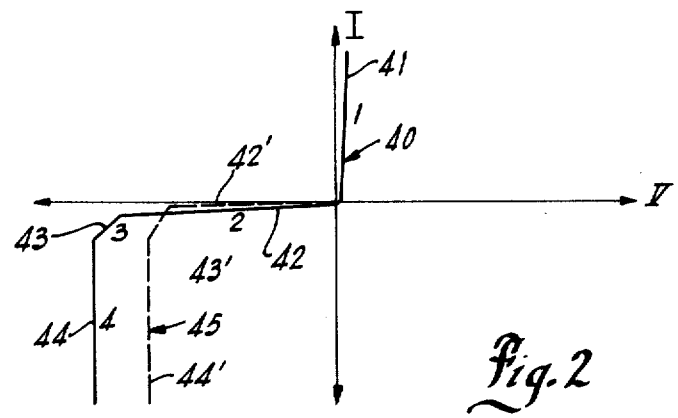
FIGS. 2 and 3 are graphical illustrations of the current vs. voltage characteristics of components employed in tachometer circuits of the present invention and in the prior art respectively.
Figure 3:
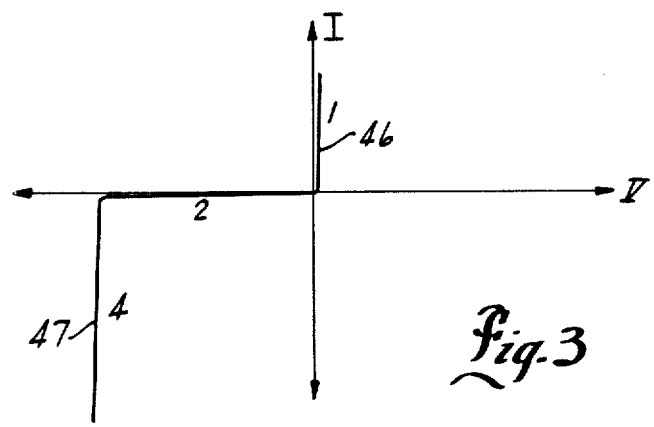

Referring particularly to FIGS. 2 and 3, FIG. 2 shows a typical current vs. voltage characteristic 40 for the voltage regulator 23 parallelled by diode 28, and FIG. 3 shows the approximately equivalent current vs. voltage characteristic of a typical Zener diode of the type used in prior art tachometer modules.

As shown in FIG. 3, a small positive voltage applied to a Zener diode results in a relatively high current, as at 46. A similar characteristic 41 is created by the regulator 23/diode 28 combination. The characteristic 41 is particularly ascribable to diode 28.

As previously noted, the voltage regulator 23 is back-biased during the positive charging of capacitor 7, and is also effectively shorted out by diode 28 during this time. Consequently, there is essentially no current flow through regulator 23 during the ignition capacitor charging cycle. Instead, the current entering the tachometer circuit via capacitor 24 and resistor 25 is essentially all flowing into node 31, from which node part of the current flows to ground 9 through diode 28, and the other part flows to ground 9 through capacitor 17 and diode 29. The portion of the current flowing to ground through resistor 33 and 34 is so small as to be negligible.

Upon discharge of the ignition capacitor 7, the regulator circuit 23 is forward biased and the diodes 28 and 29 are back-biased.

Because of the abruptness of the discharge of the voltage on capacitor 7 the largest current through resistor 25 and capacitor 24 flows at the instant immediately following discharge. Because of the inductance in microammeter coil 19, most of this sudden current flow is supplied by regulator 23, which operates at that instant on characteristic 44. Shortly thereafter the current through coil 19, resistor 27a, diode 27 and capacitor 17 reaches its maximum, and the operating point of regulator 23 moves along characteristic 44 toward characteristic 43. Capacitor 17 rapidly reaches a full charge at the voltage determined by characteristic 44 of regulator 23.

At this point the ignition discharge has been converted to a specified number of microcoulombs of electric charge passed through microammeter 18 and into capacitor 17.

It is now necessary to stop any significant further flow of current through microammeter 18, as would be the case if damping resistor 27a were omitted. The diodes 27 and 29, effectively connected in series across the meter 18, provide an easy path for the inductive current of microammeter 18 to follow as it decays to zero. The addition of damping resistor 27a causes the current to quickly decay to zero once capacitor 17 has been filled.

Regulator 23 continues to operate on characteristic 44 for a bit longer, until the current through resistor 25 and capacitor 24 has decayed to a value such as to allow regulator 23 to oprate on characteristic 43.

While operating on characteristic 44, regulator 23 is functioning as a conventional shunt regulator of low dynamic impedance. The voltage across divider resistor 33 is such as to supply the required base-to-emitter voltage of transistors 36 and 37, plus the emitter-to-base breakdown voltage of "Zener" transistor 38. If the voltage across regulator 23 were to increase slightly, transistor 37 would supply a significantly large increase of base current to transistor 36, thereby allowing it to pass a very sizeable increased current from its collector to its emitter. The large change in current through the regulator when the voltage across the regulator is changed only slightly defines the low dynamic impedance as indicated by the steep slope of the characteristic 44.

Eventually, of course, as the current through capacitor 24 and resistor 25 decays, a point is reached where the voltage across divider resistor 33 is no longer adequate to keep transistor 36 forward biased. At this point transistor 36 stops conducting, and the current supplied by transistor 37 through Zener transistor 38 now flows through resistor 39 alone, whereas before resistor 39 and transistor 36 shared this current.

This gives rise to a shunt regulator characteristic of much higher dynamic impedance, as shown by characteristic 43. Regulator 23 operates along characteristic 43 for a time.

As the current through capacitor 24 and resistor 25 continues to grow weaker, the voltage across divider resistor 33 drops to a value insufficient to overcome the emitter-to-base breakdown voltage of Zener transistor 38, and conduction through transistors 37 and 38 ceases. The only conducting path through regulator 23 is now through divider resistors 33 and 34. This creates the residual characteristic 42, where a relatively very large change in voltage is required to achieve a small change in current.

The operating point of regulator 23 slides toward the origin of the characteristic, and the sequence of events following discharge of capacitor 7 is over.

Upon the next positive voltage charging of capacitor 7, the current flow through capacitor 24 and resistor 25 is reversed, and the remaining charge on capacitor 17 is flushed out into ground through diode 29.

As the sensing resistor 33 is trimmed, the resistance increases and permits convenient calibration of the tachometer circuit. The voltage drop across resistor 33 is now a larger percentage of the total voltage across the regulator and the regulating characteristic 44 is now reached at a lower level of voltage. As illustrated by the dotted line trace 45 in FIG. 2, the characteristic of the regulator circuit 23 shrinks slightly but remains essentially the same, including the initial low dynamic impedance portion 44', connected to the higher dynamic impedance portion 43', and ending in the essentially cut off portion 42'.

The characteristic of the regulating circuit 23 is generally similar to but includes distinct differences when compared to that of a conventional Zener diode as shown typically by trace 46 in FIG. 3. As shown, the typical Zener diode does not include the enlarged knee portion 43 but rather changes from essentially zero conduction to relatively heavy conduction.

However, the dynamic impedance characteristic of a Zener diode, although low, is greater than that of the shunt regulator circuit, as shown by the slope of characteristic 47 vs. characteristic 44. The lower dynamic impedance of the regulator circuit enables a tachometer circuit incorporating such a regulator to better hold the correct RPM reading on the microammeter 18 when confronted by variations in the operating voltage level of the capacitive discharge ignition systems. Such voltage level variations do occur, not only between supposedly identical engines made on the same production line, but also over the normal operating range of any given engine. The tachometer circuit employing a regulator circuit is thus superior in this regard.

A most significant advantage of the regulator circuit over the Zener diode is in the area of temperature compensation. The amount of charge contained in the measuring capacitor 17 at each filling must be precisely controlled, and must be kept constant over the entire operating temperature range of the circuit. The amount of charge is determined by the product of the capacitance of capacitor 17 and the voltage to which it is charged.

An acceptably stable low cost capacitor 17 can be obtained, but the temperature coefficient of capacitance will be a modest positive value.

Low cost Zener diodes of the required voltage characteristics can be obtained, but the temperature coefficient of voltage will be a relatively large positive value.

Thus, the charge in the measuring capacitor 17 can be expected to increase significantly with increasing temperature, and the reading of microammeter 18 can be expected to increase proportionally.

In contrast, the regulator circuit 23 has an overall temperature coefficient of voltage which is a modest negative value, almost exactly opposite to the temperature coefficient of capacitance of capacitor 17, and hence almost perfectly cancelling the latter, to yield an exceptionally stable tachometer calibration over the full operating temperature range.

Thus, in terms of temperature stability, a tachometer circuit employing a regulator circuit such as circuit 23 is much superior to a tachometer circuit employing a Zener diode.

The desirable modest negative temperature coefficient of voltage for the overall regulator circuit 23 stems from the decreasing voltage required across resistor 33 with increasing temperature of the circuit to maintain transistor 36 in a conductive condition. The voltage required to maintain transistor 36 in conduction is the sum of the base-to-emitter voltage drops in transistors 36 and 37 plus the emitter-to-base breakdown voltage of transistor 38. As temperature increases, the sum of the base-to-emitter voltage drops in transistors 36 and 37 plus the emitter-to-base breakdown voltage of transistor 38 decreases. This gives rise to a modest overall negative temperature coefficient of voltage for the voltage required across resistor 33. With the ratio of resistor 33 to the sum of resistors 33 and 34 held constant throughout the operating temperature range, the ratio of the required voltage across resistor 33 to the voltage across regulator 23 will also remain constant and at essentially the same value as the first ratio.

Thus, the temperature coefficient of the regulated voltage will be essentially identical to the temperature coefficient of the sum of the previously mentioned three voltages, which is a modest negative value.

The greatest advantage of the regulator circuit over the Zener diode in terms of its application to the tachometer circuit is, of course, its adjustable voltage level. It thereby allows the required calibration of stored charge on capacitor 17 to be changed from a process of changing the total capacitance to one of adjusting the charging level by the simple means of trimming a resistor.

Thus, the illustrated embodiment of the invention, although operating basically in the same manner as tachometer apparatus of conventional design, provides an essentially improved and temperature stable system which can be conveniently and readily manufactured.

In the practical implementation of the present invention, the measuring capacitor 17 as well as the other components may be conventional readily available components. In particular the measuring capacitor 17 may be any suitable polyester film capacitor having reasonable tolerances and with a modest positive temperature coefficient.

Further, none of the components used in the illustrated embodiment must be especially selected with very close or special tolerances. Thus, all of the required components can be readily obtained with a specified tolerance range for qualification in any given module and the desired calibration effected by trimming of the trimmable resistor of the regulator section.

The transistorized programmable regulator 23 inherently has a desirable negative temperature coefficient very nearly equal and opposite to that of the bucket or measuring capacitor 17.

The adjustment of the trimmable resistor 33 during the calibration of the circuit does not effect the temperature coefficient characteristics of the overall system and consequently, calibration does not change the total temperature coefficient of the system such as occurs when calibration capacitors are employed.

A thick film resistor 33 is particularly suitable for use in this invention because, as previously noted, trimming is readily and accurately provided such as by a jet of abrasive particles, a laser beam or the like. The trimming apparatus and method may therefore be readily adapted to automated manufacturing procedures.

For example, the tachometer circuit can be constructed as a module with all of the components assembled and hardwired in place. A plurality of modules can be conveniently formed as a matrix of identical circuit modules on a large printed circuit board, and then wave-soldered. After an entire matrix is assembled, each of the thick film resistors 33 is exposed and aligned for machining by abrasive trimming, laser beam trimming or the like. As a result of such a process, the assembly and calibration costs would be significantly minimized.

As previously noted, certain ignition systems will generate two firing and two measuring capacitor charges per revolution while others might provide only one firing and one measuring capacitor charge per revolution. Either the meter must be changed to accommodate the change or, if the same meter is used, the measured charge must be changed to create the same average current per revolution. In the present invention, the two systems can be readily accommodated by employing different tachometer modules for the two systems in which the size of the measuring capacitor is selected to produce the necessary average current.

Further, as previously noted, certain capacitor discharge ignition systems do not bring the capacitor voltage to an external terminal. If the present tachometer module is to be employed with such systems, a simple adapter circuit such as shown in FIG. 4 may be provided to generate the necessary signal to operate the tachometer in essentially the same manner as that previously disclosed and herein described.

Figure 4:
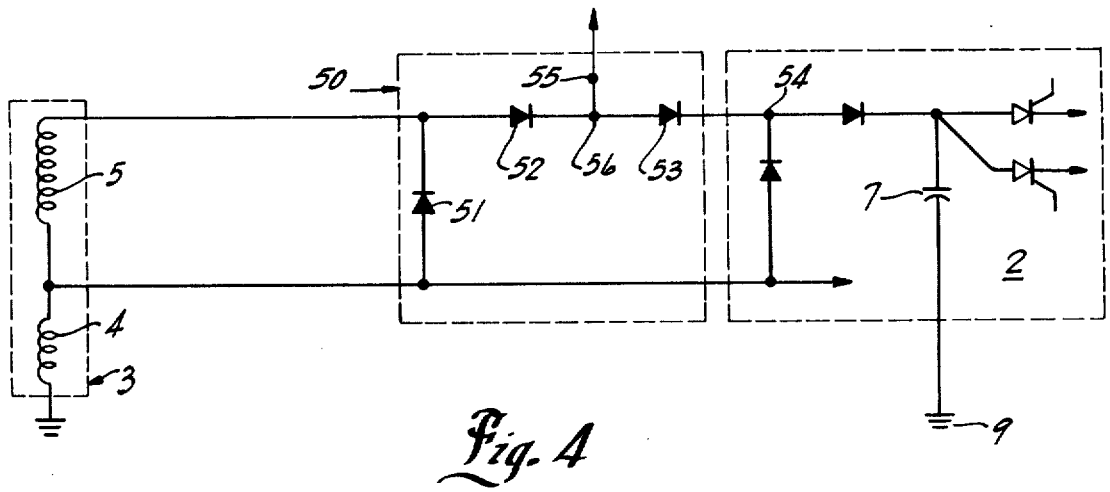
FIG. 4 is a schematic circuit illustrating the means of connection of a tachometer circuit similar to the tachometer circuit of FIG. 1 to an ignition system in which the capacitor voltage is not brought out to an external terminal.

Thus, in FIG. 4, an adapter unit 50 is shown connected between the alternator 3 and the input connections to an ignition box 2. The adapter unit 50 is a diode network which includes diodes connected in a manner similar to the charging circuit diodes 8 of the ignition unit 2. In particular, a first diode 51 connected across the alternator winding 5 and a pair of series connected diode 52 and 53 is connected between the alternator 3 and the input charging terminal 54 of the ignition unit 2. The tachometer input terminal 55 is connected to the common node 56 between diodes 52 and 53. During the ignition capacitor charging cycle, the alternator 3 is coupled to the tachometer circuit 16 through the diode 52 and the tachometer terminal 55, in essentially the same manner as in FIG. 1. The potential across the measuring capacitor is therefore similarly zero and no current flows through the meter 18. When the capacitor 7 discharges, a high transient voltage signal is created at which time current flows through the measuring capacitor 17 and meter 18 in essentially the same manner as in the tachometer circuit of FIG. 1.

The diode network of FIG. 4 can be readily constructed as a special adaptor unit with input terminals for connection to the alternator and with output terminals for connection to the ignition box.

As previously noted, certain capacitive discharge ignition systems employ a negative charging voltage for charging the ignition capacitor. The tachometer can be similarly employed and the same basic circuits may be used as shown in FIG. 5, with the appropriate reversal of the polarity connection of the diodes and the regulator section to maintain proper polarities to empty the measuring capacitor during the charging of the ignition capacitor and to fill the measuring capacitor through the meter when the ignition capacitor is discharged.

Figure 5:
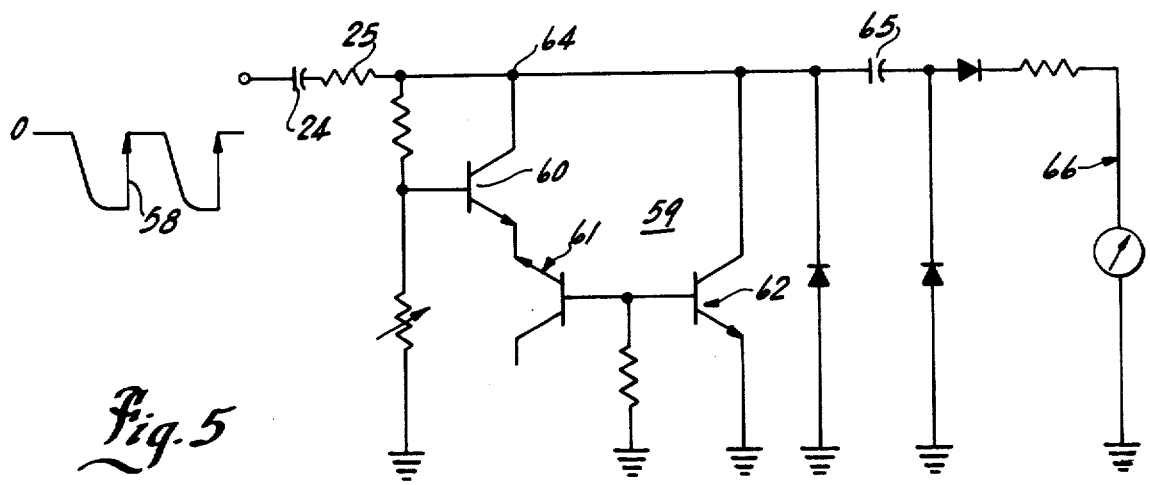
FIG. 5 illustrates a version of the tachometer circuit designed to be employed with a capacitive discharge ignition system having a negative voltage waveform on the ignition capacitor.

In the alternate polarity embodiment of the invention as shown in FIG. 5, the voltage regulator 59 includes the same type of transistors; i.e., NPN transistors but connected to respond to positive transient signals 58. In this embodiment of the invention, the regulating circuit 59 has the sensing transistor 60, the control or Zener transistor 61 and the shunt regulating transistor 62 connected with respect to ground 63 and the common node 64, with the appropriate polarity connections for this type of transistor.

The present invention has been found to provide a simple and reliable tachometer circuit which can be readily and conveniently produced employing commercially available components.

Various modes of carrying out the invention are contemplated as being within the scope of the following claims, particularly pointing out and distinctly claiming the subject matter which is regarded as the invention.

I claim:

1. A tachometer apparatus adapted to be driven from a repeating voltage signal created by the charging and discharging of the ignition capacitor of a capacitive discharge ignition system for operating an internal combustion engine, comprising an ignition signal input means, a tachometer measuring capacitor means having a predetermined fixed value of capacitance, a readout meter connected in series with said tachometer measuring capacitor means for one polarity of current flow, capacitive coupling means connecting said tachometer capacitor means to said ignition signal input means, diode means to discharge the tachometer measuring capacitor means during the ignition capacitor charging cycle and to rapidly charge the measuring capacitor during the ignition capacitor discharging cycle, and a voltage regulator connected to regulate the level of the charge on said measuring capacitor means and thereby the charge flowing through said meter to an essentially constant value for each cycle, said regulator having a negative temperature coefficient and including a sensing resistor branch connected to the measuring capacitor means to sense the voltage of the measuring capacitor means and a regulating transistor means having an output means connected to shunt current from the measuring capacitor means, said regulating transistor means having an input means, a threshold reference voltage responsive means connected between said input means of said regulating transistor means and said resistor branch to drive said regulating transistor means by the difference in voltage between the voltages of the measuring capacitor and the reference voltage responsive means and thereby regulate the charging of the measuring capacitor, said resistor branch includes a machine trimmable resistance means to control the threshold level of said regulator.

2. The tachometer apparatus of claim 1 wherein said trimmable resistance means including a machine trimmable resistor element.

3. The tachometer apparatus of claim 1 wherein said threshold reference voltage means includes a sensing transistor having an input means connected across said trimmable resistor, a threshold transistor having input elements connected in series with the output of the sensing transistor and having a voltage breakdown characteristic to produce a zener voltage response and forming a threshold control branch, said regulating transistor means having said input means connected to said threshold transistor, and said diode means including a pair of diodes having identical characteristics connected one each to the opposite sides of the measuring capacitor and to said readout meter.

4. The tachometer apparatus of claim 1 wherein said readout meter includes a moveable indicator and a positioning coil coupled to position said indicator, said coil being connected in series with the measuring capacitor for one polarity of current flow.

5. The apparatus of claim 4 including a diode and a resistor connected in series with the coil and the measuring capacitor.

6. The tachometer apparatus of claim 1 including an ignition coupling adaptor having a source input means adapted to be connected to the ignition system and having an ignition capacitor charging output means for connection to the ignition capacitor and having a tachometer circuit driving means connected to said signal input means, diode means connecting the source input means to the output means and to the driving means.

7. A tachometer apparatus adapted to be driven from a capacitive discharge ignition system for internal combustion engines, said system having an ignition capacitor adapted to be charged from an alternator, comprising an ignition signal input means, a tachometer measuring capacitor means having a positive temperature coefficient and having a predetermined fixed value of capacitance, a readout meter connected in series with said tachometer capacitor means, a coupling capacitor connected to said input means, a coupling resistor connected between said measuring capacitor means and said coupling capacitor to impress a transient voltage on said measuring capacitor to rapidly charge the measuring capacitor during the initial portion of the ignition capacitor discharging cycle, a shunt voltage regulator having a negative temperature coefficient essentially complementing the positive temperature coefficient of said measuring capacitor means, said regulator having a voltage dividing network connected between said measuring capacitor and ground and having an output node, said network including a bulk trimmable resistor means having a resistor element adapted to be machine trimmed for machine trimming of the resistance means of the trimmable resistor, and said regulator having regulatory transistor means having an output means connected to the measuring capacitor and ground and having an input means, said regulator having a control transistor with an input means connected between said output node and ground and including a Zener junction transistor means connected between the control transistor and the input means of the regulator transistor means.

8. The tachometer apparatus of claim 7 wherein said trimmable resistance means includes an abrasively trimmable resistor element.

9. The tachometer apparatus of claim 7 including a pair of diodes having essentially identical characteristics connected one each to the opposite sides of the measuring capacitor and to ground.

10. The apparatus of claim 7 including an ignition system adapter network including coupling diode means having an input means for connection to the charging alternator and an output means for connection to the ignition unit, and a signal output means connected to supply an input signal to said coupling capacitor.

11. The apparatus of claim 10 wherein said signal output means of said network includes a pair of series connected diodes having a common node connected to said coupling capacitor.

* * * * *